April 4, 1933.  A. F. FIFIELD  1,903,336

HARMONIC BALANCER

Filed Feb. 9, 1928

Inventor:
Albert F. Fifield
By Frank M. Slough
His attorney.

Patented Apr. 4, 1933

1,903,336

UNITED STATES PATENT OFFICE

ALBERT F. FIFIELD, OF ST. CATHARINES, ONTARIO, CANADA

HARMONIC BALANCER

Application filed February 9, 1928. Serial No. 252,966.

This invention relates to impulse motors and relates particularly to vibration dampers therefor.

One of the objects of my invention is to provide a vibration dampening device of simple construction and inexpensive to manufacture.

Another object of my invention is to provide a vibration damping device which is not subject to undue wear.

Another object of my invention is to provide a substantially noiselessly operating damper of the class above referred to.

Another object of my invention is to provide certain features of improvement over the vibration damper of my prior filed application for patent, Serial No. 194,625, filed May 27, 1927.

Other objects of my invention and the invention itself will become apparent by reference to the following description of certain embodiments of my invention illustrated in the accompanying drawing.

Referring to the drawing.

Figure 1:
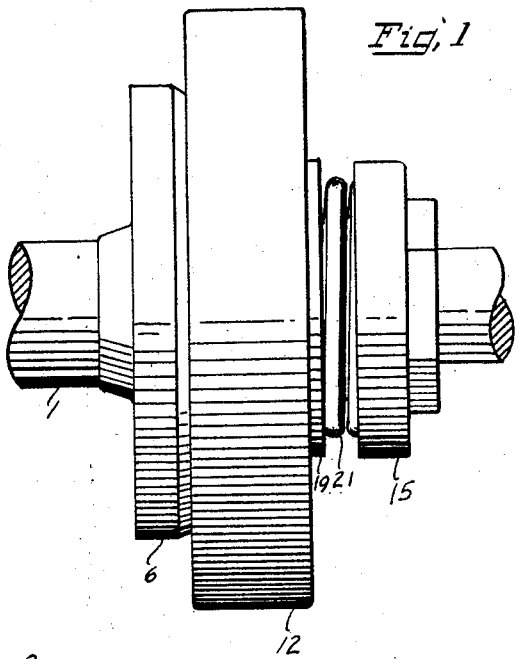
Fig. 1 is an elevational view of an embodiment of my invention.
Figures 2, 3:
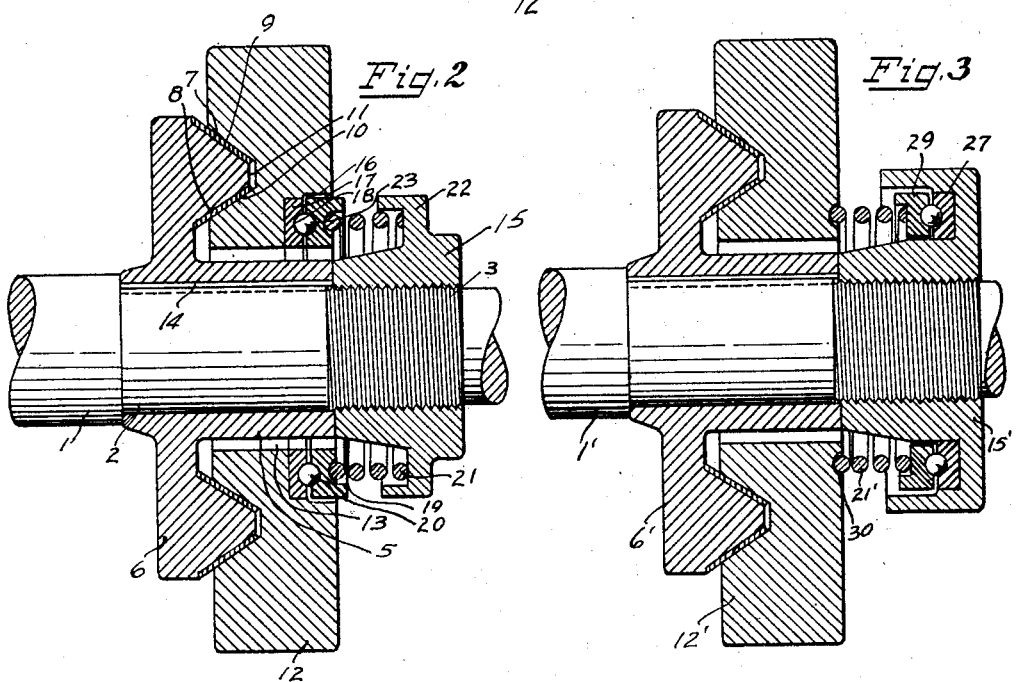
Fig. 2 is a longitudinal medial sectional view of the embodiment of Fig. 1.
Fig. 3 is a view similar to that of Fig. 2 of another embodiment of my invention.

Referring now first to Figs. 1 and 2 of the drawing and which illustrate an embodiment of my invention applied to an end of the crankshaft of an automotive explosion engine, at 1, I show the engine crank shaft reduced at 2, and threaded at 3.

A fly wheel element 12 is telescoped over the shaft, but kept out of direct contact therewith by virtue of its enlarged bore 13, in a manner later described.

A disk is illustrated having an elongated hub 5 and an annular flange 6 extending longitudinally from its free portion adjacent its periphery. The flange is provided with inner and outer annular bevelled faces 7 and 8, respectively, and faced respectively at 9 and 10 by a clutch facing to make a good clutching contact with the lateral walls of an annular recess 11 provided in an end wall of the fly wheel disk 12. The walls of the recess and the surfaces of the clutch facing are so formed and disposed that good firm clutching contact is had over a considerable portion of the opposed surfaces.

The elongated hub 5 is rigidly secured to the reduced portion 2 of the shaft and made non-rotatable relative thereto by means of a spline 14. The hub 5 is clamped between the shoulder provided by the junction of the enlarged and reduced portions of the crankshaft and a clamping nut 15 screw threaded onto the threaded portion 3 of the shaft. The bore 13 of the flywheel element 12 is made sufficiently large that when the element is in clutching engagement with the clutch disk 6, and held thereby co-axial with the reduced portion 2 of the shaft and the hub 5, that the walls of the bore will be spaced from the outer walls of the hub.

The fly wheel 12 is recessed in portions opposite the bore on its sides opposite the recess 11 at 16 and an annulus 17 comprising a thrust bearing grooved at 18 is forced into the recess making preferably a dry fit therein. An opposing bearing element 19 grooved at 20 is provided, being spring pressed by a compression spring 21 interposed between a radial flange 22 of the nut 15 and the bearing element 19 which is preferably annularly recessed to receive the end of the spring.

A set of bearing balls 23 is interposed between the bearing elements 17 and 19 and space the bearing races, comprising the grooved surfaces of said elements, and provide a relatively non-frictional thrust connection between the element 19 and the fly wheel supported element 17.

The flange 22 is preferably grooved on its inner side to guard and retain the spring 21.

The provision of the non-frictional bearing 23 ensures that the fly wheel 12 may make rotative movements relative to the shaft 1, and nut 15 carried thereby, without placing the spring 21 under appreciable stress or causing it to vibrate, rattle or produce other undesirable noise effects.

The embodiment of Fig. 3 is similar to that of Figs. 1 and 2, except that the position of the bearing comprising the bearing elements 17 and 19 of Fig. 2, is reversed; floating bearing element, corresponding to the element 19, illustrated at 29, is placed within the recess of the nut 15′ and the other bearing element, corresponding to the element 17 of Fig. 2, illustrated at 27 as being rigidly secured in driving engagement within the said nut recess in its end portion. The spring 21′ is interposed between an annular groove 30 in an end of the fly wheel element 12′ and the bearing ring element 29.

In the embodiment of Fig. 2, the spring 21 and bearing element 19 will partake of the relative rotative movement of the shaft rather than that of the fly wheel, whereas, in the embodiment of Fig. 3, the reverse is true. The spring 21 and the element 29 partake of the movements of the fly wheel 12′, rather than of the shaft 1′ and its supported disk 6′.

I find in practice that the mechanisms of my invention when applied to a crankshaft of an impulse motor, such as an explosion engine, suppress the rapid variations of rotational velocity producing what is known as torsional vibrations of the shaft with the inherent undesirable results usually accruing therefrom, and that the mechanisms of my invention will operate quietly for periods of time greatly in excess of prior devices, wherein it is attempted to journal or otherwise rotationally secure a fly wheel element of a vibration dampener on the shaft.

Having thus described my invention in two different embodiments, I am aware that numerous and extensive departures may be made from the embodiments herein illustrated and described without departing from the spirit of my invention.

I claim:

1. In a vibration damper, in combination with a rotatable shaft, an annular fly wheel encircling the shaft but radially spaced therefrom, a clutch disk and a flanged collar both rigidly secured to the shaft, the clutch disk having an axially extending wedge shaped annular portion making wedging engagement with the fly wheel to dispose the fly wheel concentrically with the shaft and thrust means interposed between the collar flange and the fly wheel comprising a compression spring and a non-friction bearing adapted to resiliently hold the fly wheel and the said clutch part in wedging engagement whereby the fly wheel will be maintained concentric with the shaft and in spring pressed engagement with the clutch element.

2. In a vibration damper, in combination with a rotatable shaft, an annular fly wheel encircling the shaft but radially spaced therefrom, a clutch disk and a flanged collar both rigidly secured to the shaft, the clutch disk having an axially extending wedge shaped annular portion making wedging engagement with the fly wheel to dispose the fly wheel concentrically with the shaft and thrust means interposed between the collar flange and the fly wheel comprising a compression spring and a non-friction bearing adapted to resiliently hold the fly wheel and the said clutch part in wedging engagement, said clutch disk part projecting into an annular recess of the fly wheel making wedging engagement with an inclined wall thereof.

3. In a vibration damper, in combination with a rotatable shaft, an annular fly wheel encircling the shaft but radially spaced therefrom, a clutch disk and a flanged collar both rigidly secured to the shaft, the clutch disk having an axially extending wedge shaped annular portion making wedging engagement with the fly wheel to dispose the fly wheel concentrically with the shaft and thrust means interposed between the collar flange and the fly wheel comprising a compression spring and a non-friction bearing adapted to resiliently hold the fly wheel and the said clutch part in wedging engagement, said clutch disk part projecting into an annular recess of the fly wheel making wedging engagement with inclined walls thereof, said bearing comprising a bearing race rigidly secured to a side of the fly wheel opposite to its said recessed side.

4. In a vibration damper, in combination with a rotatable shaft, an annular fly wheel encircling the shaft but radially spaced therefrom, a clutch disk and a flanged collar both rigidly secured to the shaft, the clutch disk having an axially extending wedge shaped annular portion making wedging engagement with the fly wheel to dispose the fly wheel concentrically with the shaft and thrust means interposed between the collar flange and the fly wheel comprising a compression spring and a non-friction bearing adapted to resiliently hold the fly wheel and the said clutch part in wedging engagement whereby the fly wheel will be maintained concentric with the shaft and in spring pressed engagement with the clutch element, said collar being longitudinally screw threaded, the threaded collar adapted for adjustment longitudinally of the shaft to increase the spring pressure exerted by said spring against the fly wheel.

5. In a vibration damper, in combination with a rotatable shaft, an annular fly wheel encircling the shaft but radially spaced therefrom, a clutch disk and a flanged collar both rigidly secured to the shaft, the clutch disk having an axially extending wedge shaped annular portion making wedging engagement with the fly wheel to dispose the fly wheel concentrically with the shaft and thrust means interposed between the collar flange and the fly wheel comprising a compression spring and a non-friction bearing adapted to resiliently hold the fly wheel and the said clutch part in wedging engagement whereby the fly wheel will be maintained concentric with the shaft and in spring pressed engagement with the clutch element, said clutch disk part projecting into an annular recess inside of the fly wheel, said recess having a pair of spaced inwardly converging walls, said clutch disk part having a pair of outwardly converging clutch engaging surfaces adapted to make intimate engagement with the said inwardly converging walls of the fly wheel recess.

In testimony whereof I hereunto affix my signature this 7th day of February, 1928.

ALBERT F. FIFIELD.